W. S. HARLEY.
VEHICLE FRAME.
APPLICATION FILED OCT. 15, 1917.
1,263,236.
Patented Apr. 16, 1918.
4 SHEETS—SHEET 1.
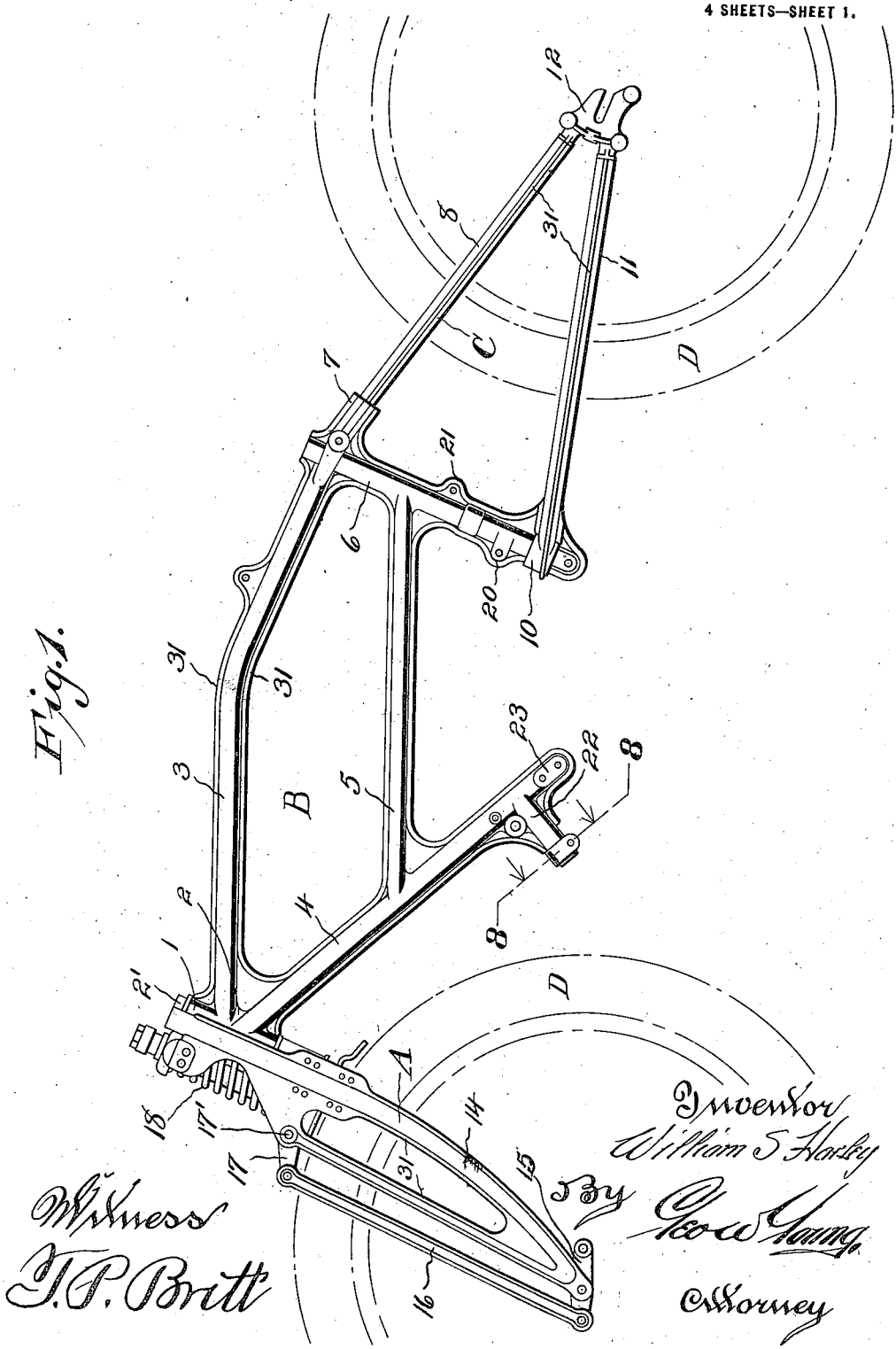

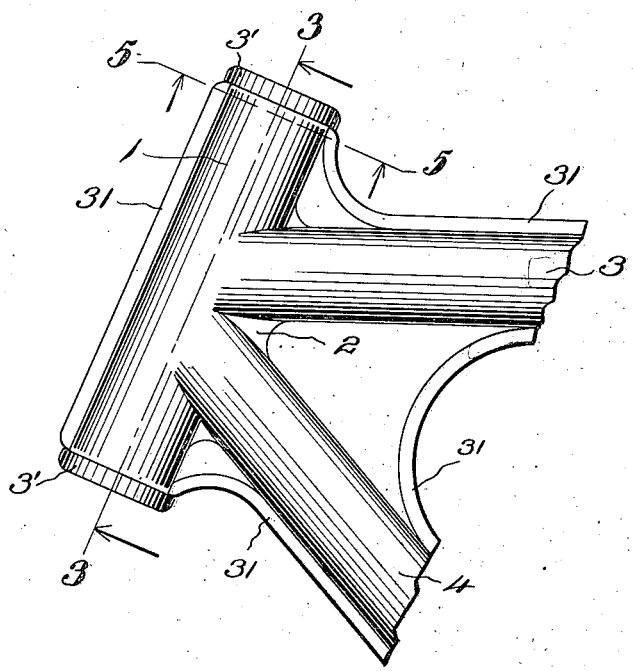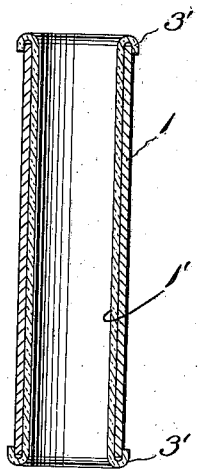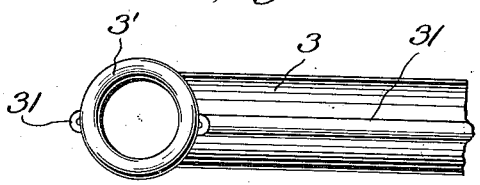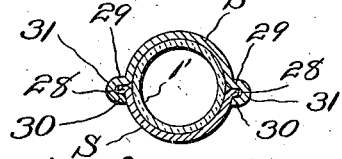

W. S. HARLEY.
VEHICLE FRAME.
APPLICATION FILED OCT. 15, 1917.

1,263,236.

Patented Apr. 16, 1918.
4 SHEETS—SHEET 3.

Witness
T. P. Britt

By

Inventor
William S Harley
Geo W Young
Attorney

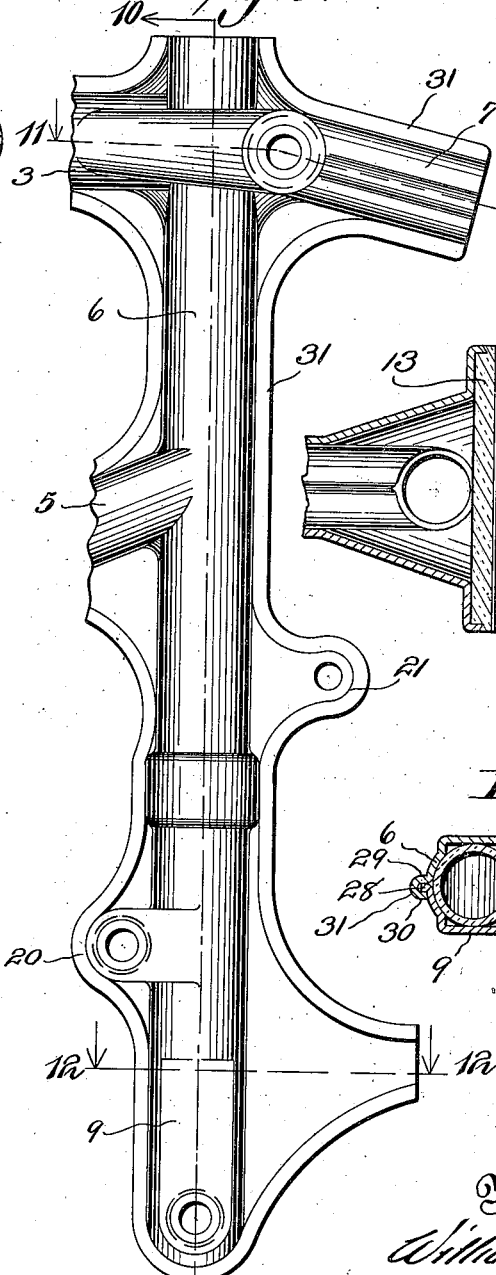

UNITED STATES PATENT OFFICE.

WILLIAM S. HARLEY, OF ⎽⎽WAUKEE, WISCONSIN, ASSIGNOR TO HARLEY-DAVIDSON MOTOR CO., OF MILWAUKEE, WISCONSIN.

VEHICLE-FRAME.

1,263,236.　　　　　Specification of Letters Patent.　　Patented Apr. 16, 1918.

Application filed October 15, 1917. Serial No. 196,630.

*To all whom it may concern:*

Be it known that I, WILLIAM S. HARLEY, a citizen of the United States, and resident of Milwaukee, in the county of Milwaukee and State of Wisconsin, have invented certain new and useful Improvements in Vehicle-Frames; and I do hereby declare that the following is a full, clear, and exact description thereof.

My invention relates to certain new and useful improvements in vehicle frames, such as bicycles, motor-cycles, or the like, the same being especially adapted to be used in connection with the latter, and being directed to that type of frame depicted in the applications Serial Nos. 196,632 and 196,633.

In endeavoring to build a comparatively light motor-cycle of sufficient strength of parts to stand more or less rough usage I have found that a frame constructed in accordance with the present invention will act as a most efficient foundation for the remaining parts of which a motor-cycle is formed.

In working out the idea or object in view to provide such a machine, as above set forth it has been found expedient to stamp the entire frame from sheet metal, and hence the primary object of the present invention is to provide a frame of the class described having its several parts composing the completed frame each struck or stamped from a single sheet of metal.

A further and more specific object of the herein disclosed invention resides in the novel manner of joining the sections forming the several parts of the frame so that reinforcing ribs are formed to thus greatly add to the strength and durability of the entire frame.

With the above and other objects in view which will appear as the description proceeds my invention consists in the novel construction, combination and arrangement of parts substantially as hereinafter described, and more particularly defined by the appended claims, it being understood that such changes in the precise embodiment of the herein disclosed invention may be made as come within the scope of the claims.

In the accompanying drawings I have illustrated one complete example of the physical embodiment of my invention constructed according to the best mode I have so far devised for the practical application of the principles thereof, and in which:

Figure 1 is a side elevational view of a portion of a motor-cycle, the novel parts thereof being shown in heavy, shaded lines.

Fig. 2 is a side elevational view of the steering-head and cluster bracket of my frame.

Fig. 3 is a longitudinal sectional view through the steering-head on the line 3—3 of Fig. 2.

Fig. 4 is a top plan view of the portion of the frame shown in Fig. 2.

Fig. 5 is a transverse sectional view through the steering-head on the line 5—5 of Fig. 2.

Fig. 9 is a side elevational view of a portion of my frame illustrating the construction of the seat-mast and seat-mast cluster bracket.

Fig. 10 is a sectional view taken longitudinally through the seat-mast on the line 10—10 of Fig. 9.

Fig. 11 is a transverse sectional view through the upper portion of the seat-mast and seat-mast cluster bracket and taken on the line 11—11 of Fig. 9, and Fig. 12 is a transverse sectional view taken through the lower end of the seat-mast on the line 12—12 of Fig. 9.

Figure 6:
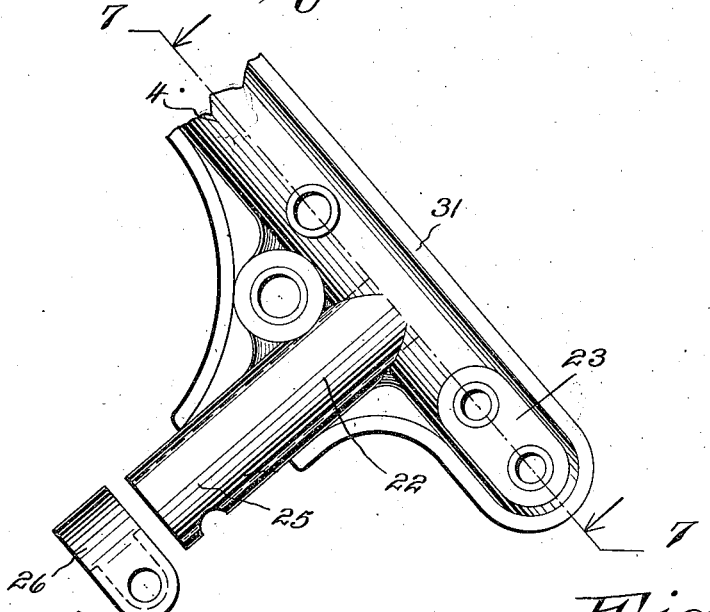
Fig. 6 is a side elevational view of the substantially right angular attaching member formed on the lower end of the head bar.
Figure 8:
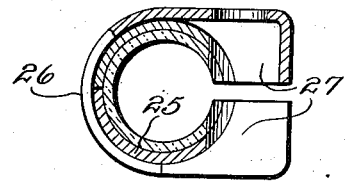
Fig. 8 is a view part in section and part in elevation and taken on the plane indicated by the line 8—8 of Fig. 1.

Referring to the drawings, particularly Fig. 1, it will be seen that my improved frame comprises essentially three distinct sections or parts A, B, and C representing the front fork, main frame or middle section, and the rear fork respectively, and the entire frame is mounted upon the usual front and rear wheels D. The specific construction of the front and rear forks will not be specifically discussed in this application, the same being fully illustrated and described in applications filed by me on Oct. 15, 1917, and bearing Serial Numbers 196,632 and 196,633, respectively.

The main frame or middle section B comprises the usual steering-head 1 for mounting the front fork A and having a cluster bracket 2 from which extends an upper horizontal reach-bar 3 and a downwardly and rearwardly inclined head bar 4 having extending rearwardly therefrom intermediate its ends a lower horizontal reach-bar 5 arranged in substantially parallel relation with the upper reach-bar. The upper reach-bar 3 has its rear end inclined downwardly and terminating at the seat-mast 6, the lower horizontal reach-bar 5 also terminating at the seat-mast 6, a cluster bracket being formed where the reach-bars 3 and 5 join said seat-mast.

The seat-mast has extending rearwardly therefrom near its upper end an outwardly flared housing or tubular bracket 7 for the reception of the upper end of the obliquely disposed forwardly inclined rear fork tube 8 and the seat-mast 6 is slightly flattened as at 9 for the reception of the inner end 10 of the lower horizontally disposed fork tube 11, the fork tubes 8 and 11 having their outer ends connected by the usual axle receiving plate 12. As best shown in Fig. 11, the inner end of the flared casing 7 has extending across its inner end adjacent seat-mast 6 a centrally bored sleeve 13 for pivotally securing the inner end of the fork tube 8 in casing 7.

The front fork A comprising a fork member 14 having its upper end pivotally secured to the steering-head 1 and having intermediately pivoted in its lower end a rocking lever 15 to one end of which the front wheel D is pivoted and to the other end of which is pivoted the lower end of a lever 16 having its upper end pivoted to a lever 17 similar to lever 15 and pivoted at 17' to the fork 14 and having its other end connected with a shock absorbing spring 18.

The steering-head 1 has secured therein a suitable sleeve or bushing 1' for the reception of the pivot bolt 2' of the front fork A, and said sleeve 1' has its ends directed laterally and then inwardly to engage the ends of the steering-head 1 as at 3' to thus further add strength to the structure.

Referring now again to the main or middle frame B, the seat-mast 6 has disposed in its lower portion a sleeve or bushing 19 in which is mounted a suitable coiled spring or other suitable cushioning means, not shown, for the usual saddle or seat, also not shown. The seat-mast has formed thereon near its lower end a lug or ear 20 for engagement with the engine, not shown, and a rearwardly projecting ear or lug 21 engageable with any other suitable mechanism usual in vehicles of this character.

Figure 7:
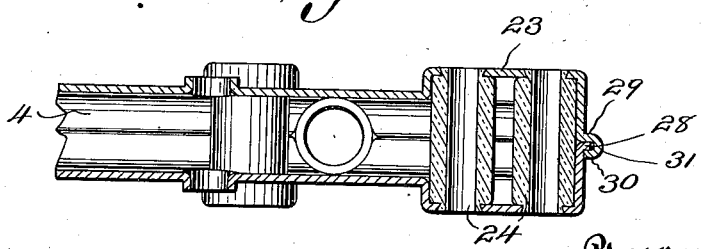
Fig. 7 is a view taken longitudinally through the lower end of the head bar on the line 7—7 of Fig. 6.

The lower end of the head bar 4 has formed thereon a substantially right angular attaching member 22 which is slightly flattened and apertured as at 23 for engagement with the motor-cycle engine, not shown. As best shown in Fig. 7, a reinforcing sleeve 24 is inserted in the head bar, in portion 23 adjacent each aperture therein to reinforce the same as will be obvious. The other arm 25 is adapted to receive a suitable foot board supporting bracket, not shown, and carries at its end a suitable clamping sleeve 26 for securing the foot board carrying bracket in place, the sleeve 26 being struck or stamped from a single sheet of metal and having its ends 27 adjacent the apertures therein inturned to reinforce the same.

The several parts A, B, and C comprising the completed motor-cycle frame, are each formed of two like sections S and S' each struck from a single sheet of metal, one section S having its peripheral edges directed laterally therefrom as at 28 and the other section S' having its peripheral edges directed laterally therefrom as at 29 and then bent upon themselves to thus securely clamp or bind the peripheral edges 28 of the section S between the portions 29 and the edges 30 of section S'.

As will be readily apparent, this method or manner of securing the sections S and S' together to form the completed parts of the frame, forms the reinforcing ribs 31 on the frame and thus greatly adds to its strength and durability and at the same time lends an attractive appearance to the frame. It will be readily seen where my present method of constructing vehicle frames of this character excels the former method of forming the same of seamless tubes in that a cheaper and more durable structure is produced.

I claim:

1. A vehicle frame stamped from sheet metal and including upper and lower horizontal reach-bars, steering-head cluster bracket, and seat-mast cluster bracket, a sleeve reinforcing the steering-head cluster bracket, and a sleeve reinforcing the seat-mast cluster bracket.

2. A vehicle frame formed from sheet metal and comprising two like sections, each including a substantially semi-cylindrical seat-mast portion, a sleeve disposed within the lower end of said seat-mast portions, said portions being tightly clamped therearound, and means for securing the adjacent edges of the seat-mast portions and the edges of the rest of the sections together.

3. A vehicle frame formed from sheet material and comprising two like sections, each including a substantially semi-cylindrical head bar portion, the lower end of each head bar portion being formed with half of a right-angular attaching member, the arms of the same being integral with the rest of the head bar portions, means for securing the adjacent edges of the halves of the right-angular attaching member and the portions of the head bar together, and a sleeve disposed in one arm of the right-angular attaching member and positioned transversely thereof, the opposite sides of the arm having apertures which aline with the opening of the sleeve.

In testimony that I claim the foregoing I have hereunto set my hand at Milwaukee, in the county of Milwaukee and State of Wisconsin.

WILLIAM S. HARLEY.